United States Patent
Xian et al.

(10) Patent No.: US 9,053,380 B2
(45) Date of Patent: Jun. 9, 2015

(54) REMOVEABLE SCANNING MODULE FOR MOBILE COMMUNICATION TERMINAL

(75) Inventors: Tao Xian, Bordentown, NJ (US); Ynjiun Paul Wang, Cupertino, CA (US); Thomas Amundsen, Turnersville, NJ (US)

(73) Assignee: Honeywell International, Inc., Fort Mill, SC (US)

( * ) Notice: Subject to any disclaimer, the term of this patent is extended or adjusted under 35 U.S.C. 154(b) by 0 days.

(21) Appl. No.: 13/530,864

(22) Filed: Jun. 22, 2012

(65) Prior Publication Data

US 2013/0341399 A1    Dec. 26, 2013

(51) Int. Cl.
*G06K 7/10*    (2006.01)

(52) U.S. Cl.
CPC .......... *G06K 7/1098* (2013.01); *G06K 7/10881* (2013.01)

(58) Field of Classification Search
USPC .................................................. 235/435–486
See application file for complete search history.

(56) References Cited

U.S. PATENT DOCUMENTS

| | | | |
|---|---|---|---|
| 5,227,614 A | 7/1993 | Danielson et al. | |
| 5,576,530 A | 11/1996 | Hagerty | |
| 5,796,088 A | 8/1998 | Wall | |
| 5,805,672 A | 9/1998 | Barkat et al. | |
| 5,895,906 A | 4/1999 | Danielson et al. | |
| 5,979,764 A | 11/1999 | Swyst et al. | |
| 6,019,286 A | 2/2000 | Li et al. | |
| 6,019,727 A | 2/2000 | Koger et al. | |
| 6,108,727 A | 8/2000 | Boals et al. | |
| 6,177,950 B1 | 1/2001 | Robb | |
| 6,188,485 B1 | 2/2001 | Stumpe | |
| 6,234,389 B1 * | 5/2001 | Valliani et al. | 235/380 |
| 6,292,272 B1 | 9/2001 | Okauchi et al. | |
| 6,536,670 B1 | 3/2003 | Postman et al. | |
| 6,580,460 B1 | 6/2003 | Takahashi et al. | |
| 6,670,985 B2 | 12/2003 | Karube et al. | |
| 6,722,569 B2 | 4/2004 | Ehrhart et al. | |
| 6,726,094 B1 | 4/2004 | Rantze et al. | |
| 6,873,356 B1 | 3/2005 | Kanbe et al. | |
| 6,944,782 B2 * | 9/2005 | von Mueller et al. | 713/320 |

(Continued)

FOREIGN PATENT DOCUMENTS

WO    WO2009158165 A1    12/2009

OTHER PUBLICATIONS

European Search Report in European Application No. 13169282.4, dated Aug. 14, 2013, 3 pages.

(Continued)

*Primary Examiner* — Christle I Marshall
(74) *Attorney, Agent, or Firm* — Additon, Higgins & Pendleton, P.A.

(57) ABSTRACT

A decodable indicia reading system can comprise a mobile communication terminal and a removable scanning module. The mobile communication terminal can comprise a microprocessor and a memory. The mobile communication terminal can further comprise at least one wired communication interface including a first electromechanical connector mechanically attached to the terminal housing. The removable scanning module can comprise an encoded information reading (EIR) device and/or an illumination module at least partially disposed within the scanning module housing. Both the mobile communication terminal and the scanning module can be at least partially received by a common housing.

19 Claims, 5 Drawing Sheets

(56) References Cited

U.S. PATENT DOCUMENTS

| | | |
|---|---|---|
| 6,950,128 B1 | 9/2005 | Sawada |
| 7,247,130 B2 * | 7/2007 | Mattila et al. ............... 493/421 |
| 7,460,170 B2 | 12/2008 | Gardiner et al. |
| 7,530,498 B2 * | 5/2009 | Wiklof et al. ............ 235/472.02 |
| 8,364,547 B2 * | 1/2013 | Metzger ........................ 705/28 |
| 8,438,044 B2 * | 5/2013 | Kerrigan et al. ................. 705/3 |
| 2002/0013161 A1 | 1/2002 | Schaeffer et al. |
| 2003/0016292 A1 | 1/2003 | Lee et al. |
| 2003/0118768 A1 * | 6/2003 | Sellars ........................ 428/40.1 |
| 2003/0222150 A1 * | 12/2003 | Sato et al. ............... 235/472.02 |
| 2008/0105743 A1 * | 5/2008 | Mills ............................. 235/441 |
| 2008/0150275 A1 * | 6/2008 | Raistrick ......................... 283/81 |
| 2009/0043205 A1 * | 2/2009 | Pelissier et al. ............... 600/446 |
| 2009/0093719 A1 * | 4/2009 | Pelissier et al. ............... 600/447 |
| 2009/0312053 A1 | 12/2009 | An |
| 2012/0153022 A1 | 6/2012 | Havens et al. |

OTHER PUBLICATIONS

Sep. 13, 2013 Communication pursuant to Article 94(3) EPC in European Application No. 13169282.4.

* cited by examiner

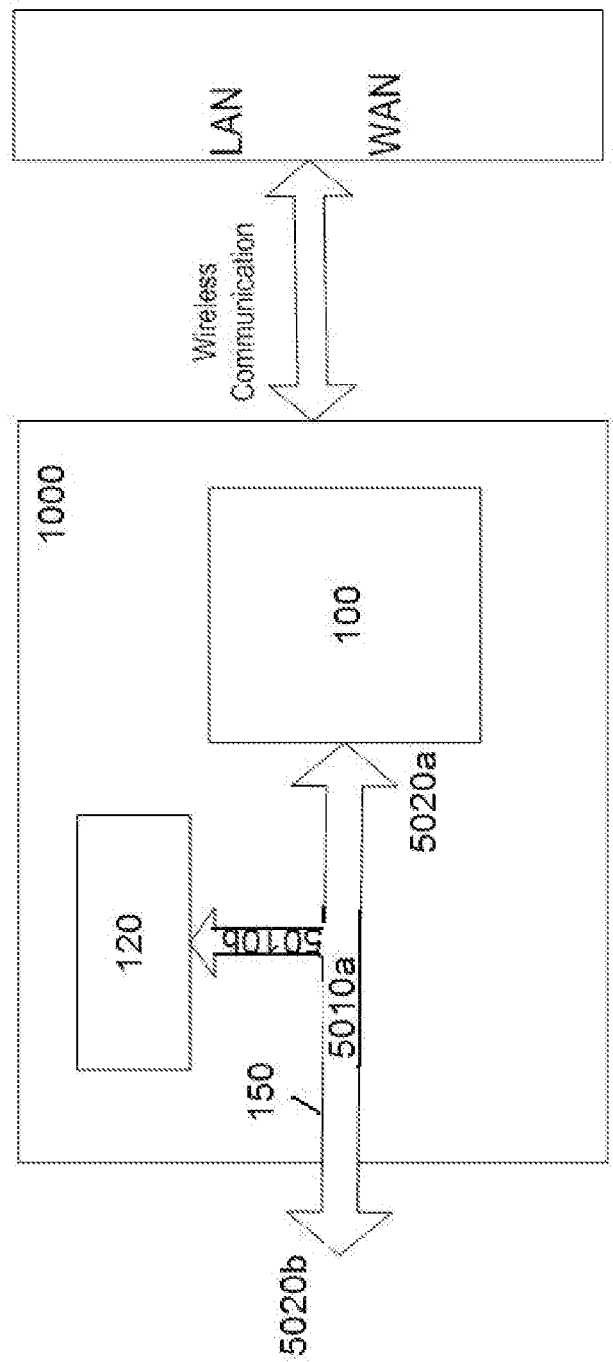

REMOVEABLE SCANNING MODULE FOR MOBILE COMMUNICATION TERMINAL

FIELD OF THE INVENTION

The present invention relates generally to mobile communication terminals, and in particular to mobile communication terminals configured to read decodable indicia.

BACKGROUND OF THE INVENTION

Decodable indicia are patterns, marks, or messages which are designed to be scanned and interpreted by computer and/or other mechanical and/or automated methods. Many known types of decodable indicia fall under the category of barcodes. Barcodes are graphical representations of data, the most common of which are referred to as one dimensional (1D) and two dimensional (2D) barcodes. 1D barcodes are graphical entities that represent data by varying the widths and spacing of parallel lines. 2D barcodes are also graphical entities that represent data, but in addition to the parallel lines, or bars, a 2D barcode may contain rectangles, dots, hexagons and other geometric patterns in two dimensions. The data encoded in the barcodes are interpreted by optical scanners and/or software. Barcodes can be scanned by special optical scanners called barcode readers as well as by general purpose devices such as smart phones. Other types of decodable indicia include optical character recognition (OCR), glyphs, or other visual markings. Also, non-visual technologies such as magnetic strips, radio-frequency identification (RFID), and other non-visual technologies fall under the definition of decodable indicia as well.

SUMMARY OF THE INVENTION

In one embodiment, there can be provided a decodable indicia reading system comprising a mobile communication terminal and a removable scanning module. The mobile communication terminal can comprise a microprocessor and a memory. The mobile communication terminal can further comprise at least one wired communication interface including a first electromechanical connector mechanically attached to the terminal housing. The removable scanning module can comprise an encoded information reading (EIR) device and/or an illumination module at least partially disposed within the scanning module housing. Both the mobile communication terminal and the scanning module can be at least partially received by a common housing. The removable scanning module can be configured to be communicatively coupled to the mobile communication terminal via an electromechanical interface comprising a first plurality of wires electrically coupling a second electromechanical connector to a third electromechanical connector. The second electromechanical connector can be electromechanically coupled to the first electromechanical connector. The electromechanical interface can comprises a second plurality of wires electrically coupling the scanning module to the first plurality of wires.

The EIR device can be provided by an optical indicia reading device, an RFID reading device, and/or a magnetic card reading device. The EIR device can be configured to output raw message data containing an encoded message and/or output decoded message data corresponding to an encoded message.

In some embodiments, the EIR device can be provided by an imaging device comprising a two-dimensional image sensor configured to output an analog signal representative of light reflected by a physical object located within a field of view of the two-dimensional image sensor, an amplifier configured to produce an amplified analog signal by amplifying the analog signal, an analog-to-digital (A/D) converter configured to convert the amplified analog signal into a digital signal representative of the light reflected by the physical object, and a control circuit configured to control the imaging device. Alternatively, the EIR device can be provided by a laser scanning device comprising a laser source, a photodetector configured to generate an analog signal representative of a received light beam of variable intensity, and an A/D converter configured to convert the analog signal into a digital signal.

The mobile communication terminal can further comprise a wireless communication interface at least partially disposed within the terminal housing and communicatively coupled to the microprocessor, the wireless communication interface.

The mobile communication terminal can further comprise a built-in EIR device provided by an optical indicia reading device, an RFID reading device, and/or a magnetic card reading device. The EIR device can be configured to output raw message data containing an encoded message and/or output decoded message data corresponding to an encoded message.

The mobile communication terminal can further comprise a built-in imaging device.

The electromechanical interface can be at least partially disposed within the scanning module housing.

The first electromechanical connector can be provided, for example, but not limited to, a USB connector, a PCMCIA connector, an Ethernet connector.

The mobile communication terminal can be provided by a mobile phone, a smart phone, a tablet personal computer (PC), or a personal digital assistant (PDA).

The illumination module can comprise an illumination pattern light source bank including one or more light sources, an aiming pattern light source bank including one or more light sources, and/or an illumination assembly control module.

In another embodiment, there is provided a removable scanning module for coupling to a mobile communication terminal via an electromechanical interface. The removable scanning module can comprise a housing at least partially containing an encoded information reading (EIR) device and/or an illumination module. The electromechanical interface can comprises a first plurality of wires electrically coupling a first electromechanical connector to a second electromechanical connector. The first electromechanical connector can be configured to be electromechanically coupled to the mobile communication terminal. The second electromechanical connector can be configured to be electromechanically coupled to a peripheral device. The electromechanical interface comprises a second plurality of wires electrically coupling the scanning module to the first plurality of wires. The removable scanning module can be configured to be at least partially disposed within a housing configured to at least partially receive the mobile communication terminal and the removable scanning module.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 5 schematically illustrates a block diagram of the decodable indicia reading system disclosed herein.

The drawings are not necessarily to scale, emphasis instead generally being placed upon illustrating the principles of the invention. In the drawings, like numerals are used to indicate like parts throughout the various views.

DETAILED DESCRIPTION OF THE INVENTION

General purpose mobile communication terminals, such as smart phones, tablet personal computers (PCs), personal digital assistants (PDA), and other similar devices usually possess the computing power sufficient for reading and/or decoding decodable indicia. However, there are many challenges related to the scanning performance of mobile communication terminals having minimized form factors, such as smart phones or tablet PCs. First, an embedded camera may not satisfy the requirement for aggressive bar code scanning due to illumination and imager-related constraints leading to increased focusing and/or exposure times. Even if a mobile communication terminal has an embedded illumination source, such a source is usually not designed for providing illumination adequate for image processing and pattern recognition purposes. Finally, mobile communication terminals may not be robust enough for use in retail or manufacturing environments.

The noted deficiencies can be addressed by providing a removable scanning module intended to be used with a mobile communication terminal. Thus, in one embodiment, there is provided a decodable indicia reading system comprising a general purpose mobile communication terminal (for example, a smart phone, a PDA, or a tablet PC) and a removable scanning module. The scanning module can comprise one or more optical encoded information reading (EIR) devices (including but not limited to laser scanning devices and two-dimensional monochrome or color imaging devices), one or more non-visual information reading devices (including but not limited to RFID reading devices, NFC reading devices, and magnetic card reading devices), and/or one or more auxiliary devices (including but not limited to illumination devices). The EIR device can be configured to output raw message data containing an encoded message and/or output decoded message data corresponding to an encoded message.

In one illustrative embodiment, the scanning module can comprise a 2D imaging device and an illumination device. A skilled artisan would appreciate the fact that scanning modules comprising other combinations of imaging devices, optical encoded information reading devices, non-visual encoded information reading devices, and/or auxiliary devices are within the scope of this disclosure.

Figure 1A:
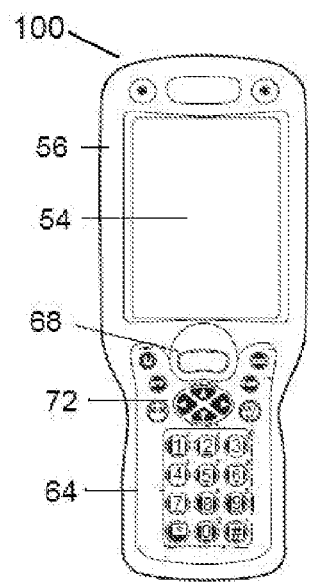
FIGS. 1a-1b schematically illustrate one embodiment of a mobile communication terminal.
Figure 1B:
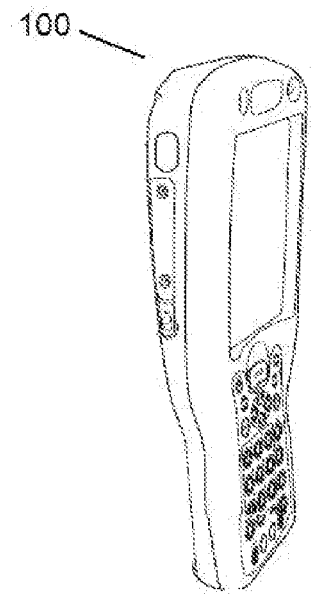

One illustrative embodiment of a mobile communication terminal is shown in FIGS. 1a (front panel view) and 1b (side panel view). The mobile communication terminal 100 can comprise a housing 52 within which other components of mobile communication terminal 100 can be disposed. A display 54 can be disposed on the front panel 56. Also disposed on the front panel 56 can be a keyboard 64 including functional keys 68, navigation keys 72, and/or numeric keys. At least one connector of a wired communication interface can be disposed on the bottom panel or side panel of the housing 52 (e.g., a USB, PCMCIA, Ethernet, or MiniUSB connector).

Figure 2A:
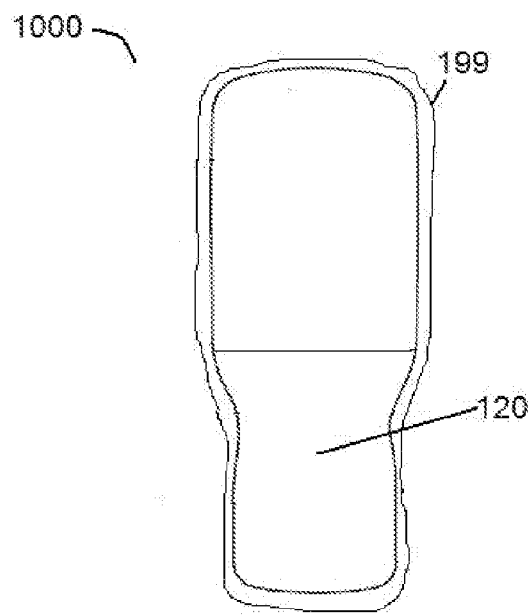
FIGS. 2a-2b schematically illustrate one embodiment of the decodable indicia reading system disclosed herein.
Figure 2B:
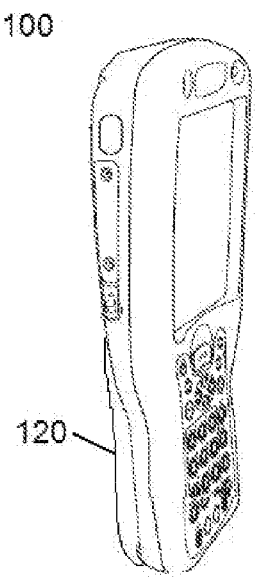

In a further aspect, a removable scanning module can be connected to a mobile communication terminal via the wired communication interface. As schematically shown in FIGS. 2a (rear panel view) and 2b (side panel view), removable scanning module 120 can have a form factor designed for the scanning module to be mechanically connected by the mobile communication terminal 100 by a common housing 199 configured to at least partially receive both mobile communication terminal 100 and removable scanning module 120. In some embodiments, housing 199 can be made of rubber, silicon rubber, or similar materials. The housing can be designed to secure the electromechanical connection, and provide industrial-grade mechanical protection for various applications of the resulting decodable indicia reading system.

Figure 3:
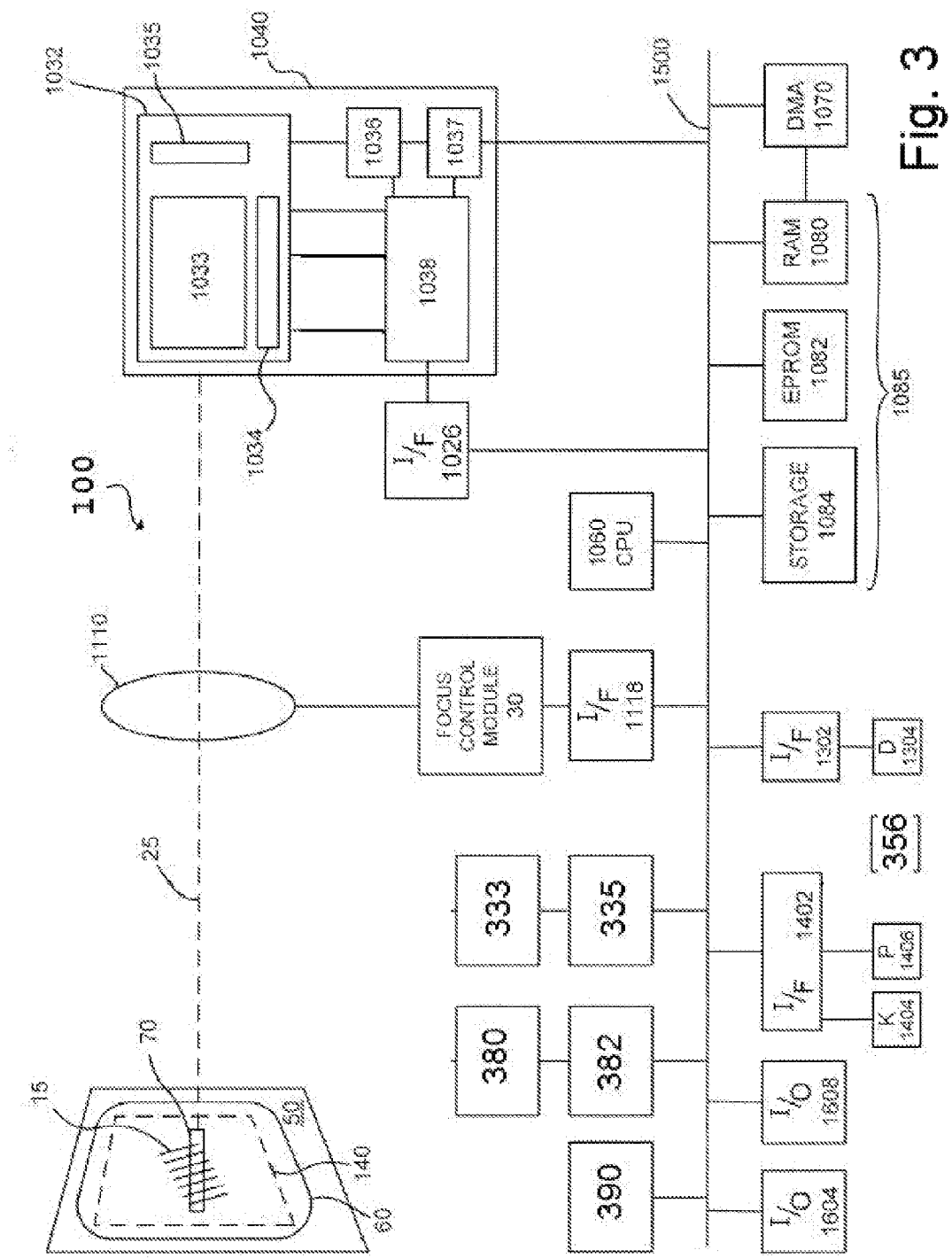
FIG. 3 depicts a component-level diagram of an illustrative embodiment of the mobile communication terminal.

Component-level diagram of an illustrative embodiment of the mobile communication terminal is now being described with references to FIG. 3. Mobile communication terminal 100 can include CPU 1060 communicatively coupled to system bus 1500. Also coupled to system bus 1500 can be various interface circuits for coupling the peripheral devices, including, e.g., interface circuit 1302 for coupling display 1304, and interface circuit 1402 for coupling keyboard 1404 and pointing device 1406 to system bus 1500.

In a further aspect, the mobile communication terminal 100 can include one or more communication interfaces 1604, 1608 for providing communications with external devices. Communication interfaces 1604, 1608 can include one or more wired interfaces (e.g., Ethernet (IEEE 802.3), USB, RS/485, etc.) and one or more wireless interfaces (e.g., interfaces configured to support at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family).

Also coupled to system bus 1500 can be memory 1085 provided by random access memory (RAM) 1080. In some embodiments, memory 1085 can further comprise a nonvolatile memory such as EPROM 1082, and/or a storage memory device 1084 such as a flash memory or a hard drive.

Mobile communication terminal 100 can include a direct memory access unit (DMA) 1070 providing direct communications of one or more devices communicatively coupled to system bus 1500 with RAM 1080. In another embodiment, mobile communication terminal 100 can employ a system bus providing for bus arbitration mechanism (e.g., a PCI bus) thus eliminating the need for a central DMA controller. Other embodiments of the system bus architecture and/or direct memory access components providing for efficient data transfer between one or more devices communicatively coupled to system bus 1500 and RAM 1080 can be provided.

In some embodiments, mobile communication terminal 100 can include a build-in imaging assembly 1040 configured to acquire two-dimensional monochrome and/or color images. Imaging assembly 1040 can comprise an image sensor 1032 including a multiple pixel image sensor 1033 array having pixels arranged in rows and columns, associated column circuitry 1034, and row circuitry 1035. In one embodiment, the image sensor 1033 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention. Associated with the image sensor 1032 can be amplifier circuitry 1036, and an A/D converter 1037 which converts image information in the form of analog signals read out of image sensor 1033 into image information in the form of digital signals. In one embodiment, the A/D converter 1037 can be provided by an A/D array.

Image sensor 1032 can also have an associated timing and control circuit 1038 for use in controlling e.g., the exposure period of image sensor 1032, gain applied to the amplifier circuitry 1036. As noted herein supra, the circuit components 1032, 1036, 1037, and 1038 can be packaged into a common imaging assembly 1040.

Mobile communication terminal 100 can include interface circuit 1026 for coupling image sensor timing and control circuit 1038 to system bus 1500. Mobile communication terminal 100 can be configured to read out analog signals representative of light incident on one or more pixels. The read out analog signals can be amplified by the analog signal amplifier 1036. The analog signals can then be fed to the input of the ADC 1037. The resulting digital values representative of the analog signals can be stored in a system memory such as RAM 1080. Image frame data stored in RAM 1080 can be in the form of multibit pixel values, with each multibit pixel value representing light incident on a pixel of image sensor 1033. DMA unit 1070 can route image information read out from image sensor 1032 to RAM 1080. In another aspect, CPU 1060 which can be adapted to read out image data stored in memory 1080 and subject such image data to various image processing algorithms.

In another aspect, the mobile communication terminal 100 can include a variable focus imaging lens 1110 for use in focusing an image of a decodable indicia located within a field of view 140 on a substrate 50 onto image sensor 1033. Imaging light rays can be transmitted about imaging axis 25. Variable focus imaging lens 1110 can be adapted to be capable of multiple best focus distances and multiple focal lengths. Variable focus imaging lens 1110 can be operative to provide a new best focus distance and/or focal length within a fraction of a frame time in response to an applied input control signal being applied to the variable focus imaging lens 1110. In one embodiment, the variable focus imaging lens 1110 can be provided by a deformable imaging lens, e.g., a deformable fluid lens or gel lens. In another embodiment, the variable focus imaging lens 1110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

Mobile communication terminal 100 can further comprise a battery 356. Mobile communication terminal 100 can further comprise a GPS receiver 380 communicatively coupled to system bus 1500 via interface 382. The mobile communication terminal 100 can further comprise at least one connector 390 configured to receive a subscriber identity module (SIM) card, also communicatively coupled to system bus 1500. A skilled artisan would appreciate the fact that mobile communication terminal 100 can comprise various other components, circuits and interfaces.

In some embodiments, the mobile communication terminal 100 can further comprise an embedded EIR device 333 communicatively coupled to system bus 1500 via interface 335. EIR device 333 can be provided, for example, by a bar code reading device, an RFID reading device, an NFC reading device, or a magnetic card reading device. The EIR device can be configured to output raw message data containing an encoded message and/or output decoded message data corresponding to an encoded message. As used herein, "message" is intended to denote a byte sequence or a character string comprising alphanumeric and/or non-alphanumeric characters. An encoded message can be used to convey information, such as identification of the source and the model of an item, for example, in an EPC code.

Figure 4A:
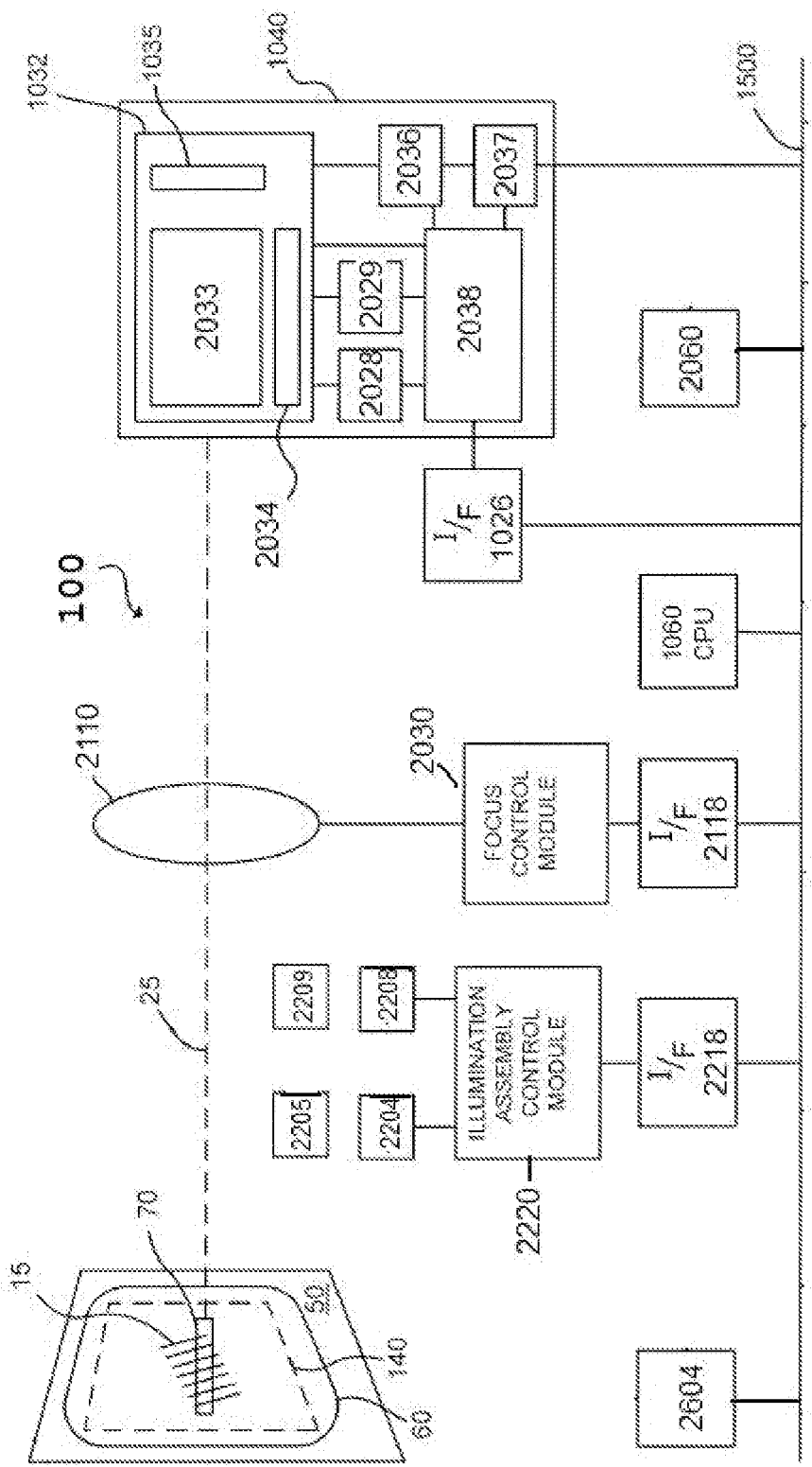
FIGS. 4a-4b illustrate component-level diagrams of various illustrative embodiments of the removable scanning module disclosed herein.

Component-level diagram of one illustrative embodiment of the removable scanning module is now being described with references to FIG. 4a.

Removable scanning module 120 can include an imaging assembly 1040 configured to acquire two-dimensional monochrome and/or color images. Imaging assembly 2040 can comprise an image sensor 2032 including a multiple pixel image sensor 2033 array having pixels arranged in rows and columns, associated column circuitry 2034, and row circuitry 2035. In one embodiment, the image sensor 2033 can be provided by a charge-coupled device (CCD) image sensor. In another embodiment, the image sensor can be provided by a complementary metal-oxide semiconductor (CMOS) image sensor. A skilled artisan would appreciate the fact that other types of image sensors are within the scope of the invention. Associated with the image sensor 2032 can be amplifier circuitry 2036, and an analog to digital converter 2037 which converts image information in the form of analog signals read out of image sensor 2033 into image information in the form of digital signals. Image sensor 2032 can also have an associated timing and control circuit 2038 for use in controlling e.g., the exposure period of image sensor 2032, gain applied to the amplifier circuitry 2036. As noted herein supra, the circuit components 2032, 2036, 2037, and 2038 can be packaged into a common imaging assembly 2040.

Removable scanning module 120 can include circuit 1026 for coupling image sensor timing and control circuit 2038 to system bus 2500. Removable scanning module 120 can be configured to read out analog signals representative of light incident on one or more pixels. The read out analog signals can be amplified by the analog signal amplifier 2036. The analog signals can then be fed to the input of the ADC 2037. The resulting digital values representative of the analog signals can be combined to form image frame data comprising multibit pixel values, with each multibit pixel value representing light incident on a pixel of image sensor 2033. The image frame data can be transmitted to mobile communication terminal 100 via a wired I/O interface 1604 provided, e.g., by Ethernet (IEEE 802.3), USB, RS/485, etc. In some embodiments, the image frame data can be buffered in RAM 2080 before being transmitted to mobile communication terminal 100.

In another aspect, the removable scanning module 120 can include a variable focus imaging lens 2110 for use in focusing an image of a decodable indicia located within a field of view 140 on a substrate 50 onto image sensor 2033. Imaging light rays can be transmitted about imaging axis 2025. Variable focus imaging lens 2110 can be adapted to be capable of multiple best focus distances and multiple focal lengths. Variable focus imaging lens 2110 can be operative to provide a new best focus distance and/or focal length within a fraction of a frame time in response to an applied input control signal being applied to the variable focus imaging lens 2110. In one embodiment, the variable focus imaging lens 2110 can be provided by a deformable imaging lens, e.g., a deformable fluid lens or gel lens. In another embodiment, the variable focus imaging lens 2110 can be provided by a non-deformable fluid lens, e.g., an electrowetting liquid lens wherein the surface tension of one or more volumes of lens liquid changes in response to a signal being applied to the lens, or a liquid crystal type lens wherein indices of refraction of one or more volumes of lens fluid change in response to a signal being applied to the lens.

In some embodiments, removable scanning module 120 can include a microprocessor 2060 communicatively coupled to system bus 2500. Microprocessor 2060 can be provided by a general purpose microprocessor or by a specialized microprocessor. Microprocessor 2060 can be programmed to decode optical decodable indicia, by processing digital signals outputted by the A/D converter converting analog signals representative of light incident on one or more pixels of the two-dimensional imaging device. The resulting decoded message data corresponding to the decodable indicia can be transferred to mobile communication terminal 100 via wired I/O interface 1604.

In some embodiments, removable scanning module 120 can also include an illumination pattern light source bank 2204 for use in generating an illumination pattern 60 substantially corresponding to a field of view 140 of imaging assembly 2040 and an aiming pattern light source bank 2208 for use in generating an aiming pattern 70 on substrate 50. Shaping optics 2205 and 2209 can be provided for shaping light from bank 2204 and bank 2208 into pattern 60 and into pattern 70 respectively. In use, terminal 100 can be oriented by an operator with respect to a substrate 50 bearing decodable indicia 15 in such manner that aiming pattern 70 is projected on a decodable indicia 15.

Each of illumination pattern light source bank 2204 and aiming pattern light source bank 2208 can include one or more light sources provided, e.g., by light emitting diodes (LEDs). Variable focus imaging lens 2110 can be controlled with use of focus control module 2030 and the illumination assembly comprising illumination pattern light source bank 2204 and aiming pattern light source bank 2208 can be controlled with use of illumination assembly control module 2220. Focus control module 2030 can send signals to variable focus imaging lens 2110 e.g., for changing a best focus distance and/or a focal length of variable focus imaging lens 2110. Illumination assembly control module 2220 can send signals to illumination pattern light source bank 2204 e.g., for changing a level of illumination output by illumination pattern light source bank 2204.

In one example, the removable scanning module 120 can be adapted so that illumination assembly control module 2220 controls light source bank 2204 to synchronize variable illumination level with certain lens settings. For example, illumination assembly control module 2220 controls light source bank 2204 to have a relatively lower level of illumination output when the best focus distance of imaging lens 2110 is set to a first shorter best focus distance, and a relatively higher level of illumination output when the best focus distance of imaging lens 2110 is set at a longer best focus distance.

Figure 4B:
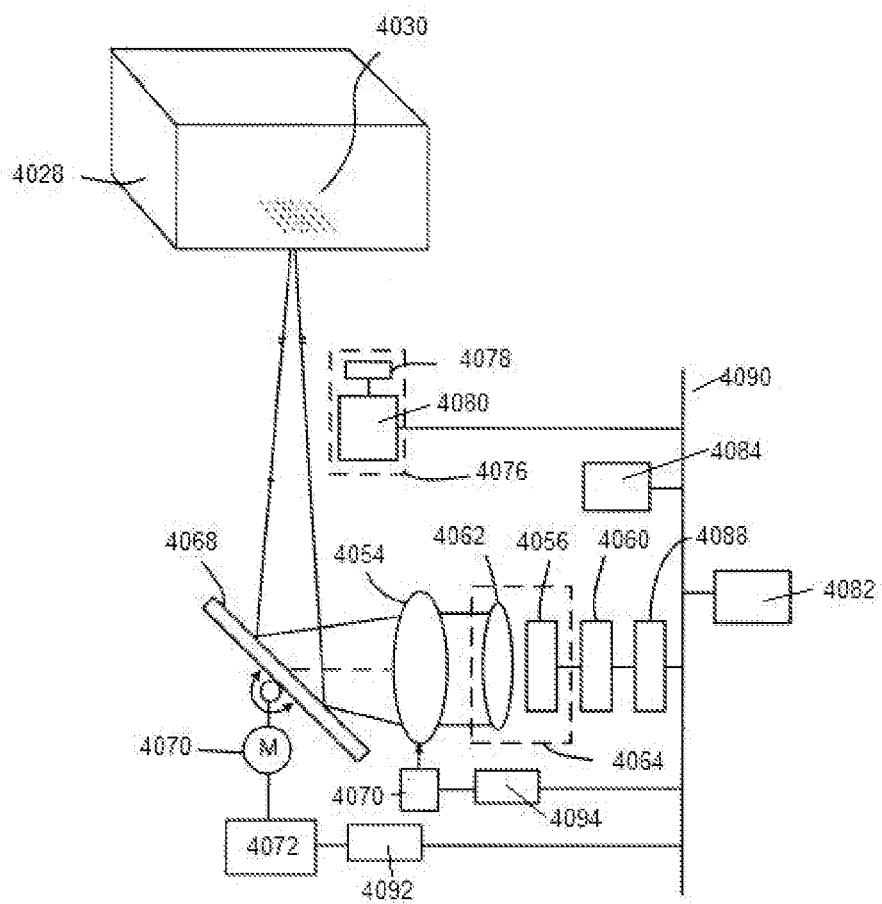

Component-level diagram of another illustrative embodiment of the removable scanning module is now being described with references to FIG. 4b.

Removable scanning module can comprise a laser scanner which uses a focused laser beam to sequentially scan the bars and spaces of a bar code symbol pattern to be read. As the laser beam is scanned across the bar code symbol, a portion of the reflected light beam is collected by optics within the scanner. The collected light signal can subsequently be focused upon a photo-detector within the scanner. The photo-detector can, in one example, generate an analog electrical signal which can be converted into a digital signal representative of the bar code symbol.

As schematically shown in FIG. 4b, removable scanning module 120 can comprise a lens assembly 4054, which can include a fixed lens, a variable position lens holder adapted for use with a moveable lens system, or a variable focus fluid lens, for example. Removable scanning module 120 can further comprise a laser source 4056 which can emit a laser beam. Laser source 4056 can be coupled to a laser source control circuit 4060. Light from laser source 4056 can be shape by collimating optics 4062 and lens assembly 4054. The combination of laser source 4056 and collimating optics 4062 can be regarded as a laser diode assembly 4064. The laser beam emitted by laser source 4056 can illuminate substrate 4028 bearing decodable indicia 4030. Scanning mirror reflector 4068 disposed within the optical path of the laser beam emitter by laser source 4056 can oscillate to direct the laser beam across the entire surface to be scanned. Reflector 4068 can be driven by scan motor 4070 which can be coupled to control circuit 4072.

The laser beam emitted by laser source 4056 can reflect off substrate 4028 and then travel back to photo-detector assembly 4076. The incident laser light can be reflected by areas of dark and white bands of the bar code 4030 borne by substrate 4028. The reflected beam can thus have variable intensity representative of the bar code pattern. Photo-detector assembly 4076 including photo-detector 4078 and A/D converter 4080 can receive the reflected beam of variable intensity, generate an analog signal corresponding to the reflected beam, and convert it to a digital signal representative of the beam intensity. The resulting digital values representative of the analog signal can be combined to form 1D image data. The image data can be transmitted to mobile communication terminal 100 via a wired I/O interface (not shown in FIG. 4b) provided, e.g., by Ethernet (IEEE 802.3), USB, RS/485, etc. In some embodiments, the image frame data can be buffered in RAM (not shown in FIG. 4b) before being transmitted to mobile communication terminal 100.

In some embodiments, removable scanning module 120 can include microprocessor 4084 communicatively coupled to system bus 4090. Microprocessor 4084 can be provided by a general purpose microprocessor or by a specialized microprocessor. Microprocessor 4084 can be programmed to decode bar code symbols, by processing a digital signal corresponding to the reflected laser beam to determine a spatial pattern of dark cells and light cells, followed by converting each light and dark cell pattern determined into a character of character string via table lookup. The resulting decoded message data corresponding to the decodable indicia can be transferred to mobile communication terminal 100 via the wired I/O interface.

In a further aspect, removable scanning module 120 can include various interface circuits for coupling various devices to system bus 4090, including first interface circuit 4088 coupled to laser source control circuit 4060, second interface circuit 4092 coupled to motor control circuit 4072, and third interface circuit 4094 coupled to electrical power input unit 4096.

FIG. 5 schematically illustrates a block diagram of the decodable indicia reading system disclosed herein. Decodable indicia reading system 1000 can comprise mobile communication terminal 100 and removable scanning module 120 interconnected via electromechanical interface 150.

In a further aspect, electromechanical interface 150 can have an Y-form, by comprising a plurality of wires 5010a electrically coupled to two electromechanical connectors 5020a and 5020b. Electromechanical connector 5020a can be pluggable into an electromechanical connector comprised by a wired I/O interface of mobile communication terminal 100.

Electromechanical connector 5020b can be used for coupling other peripheral devices. A second plurality of wires 5010b can be electrically coupled to the first plurality of wires 5010a, thus constituting an Y-shaped interface. Another end of the second plurality of wires 5010b can be communicatively coupled to removable scanning module 120, either directly or via a pair of electromechanical connectors.

In another aspect, mobile communication terminal 100 can be in communication with an external computer 171 via a wired or wireless communication interface and one or more communication networks. In one embodiment, network frames can be exchanged by mobile communication terminal 100 and external computer 171 via one or more routers, base stations, and other infrastructure elements. In another embodiment, external computer 171 can be reachable by mobile communication terminal 100 via a local area network (LAN). In a yet another embodiment, external computer 171 can be reachable by mobile communication terminal 100 via a wide area network (WAN). A skilled artisan would appreciate the fact that other methods of providing interconnectivity between mobile communication terminal 100 and external computer 171 relying upon LANs, WANs, virtual private networks (VPNs), and/or other types of network are within the scope of this disclosure. In one embodiment, the communications between mobile communication terminal 100 and external computer 171 can comprise a series of requests and responses transmitted over one or more TCP connections, although a person skilled in the art would appreciate the fact that using other transport and application level protocols is within the scope of this disclosure. In some embodiments, at least one data frame transmitted by mobile communication terminal 100 to external computer 171 can comprise raw message data or decoded message data received by mobile communication terminal 100 from removable scanning module 120.

While the present invention has been particularly shown and described with reference to certain exemplary embodiments, it will be understood by one skilled in the art that various changes in detail may be affected therein without departing from the spirit and scope of the invention as defined by claims that can be supported by the written description and drawings. Further, where exemplary embodiments are described with reference to a certain number of elements it will be understood that the exemplary embodiments can be practiced utilizing less than the certain number of elements.

A decodable indicia reading system can comprise a mobile communication terminal and a removable scanning module. The mobile communication terminal can comprise a microprocessor and a memory. The mobile communication terminal can further comprise at least one wired communication interface including a first electromechanical connector mechanically attached to the terminal housing. The removable scanning module can comprise an encoded information reading (EIR) device and/or an illumination module at least partially disposed within the scanning module housing. Both the mobile communication terminal and the scanning module can be at least partially received by a common housing. The removable scanning module can be configured to be communicatively coupled to the mobile communication terminal via an electromechanical interface comprising a first plurality of wires electrically coupling a second electromechanical connector to a third electromechanical connector. The second electromechanical connector can be electromechanically coupled to the first electromechanical connector. The electromechanical interface can comprises a second plurality of wires electrically coupling the scanning module to the first plurality of wires.

A small sample of systems, methods, and apparata that are described herein is as follows:

A1. A decodable indicia reading system comprising:
a mobile communication terminal comprising a first housing, a microprocessor disposed within said first housing, a memory disposed within said first housing, and at least one wired communication interface including a first electromechanical connector mechanically attached to said first housing;
a removable scanning module comprising a second housing at least partially containing at least one of: an imaging device, a laser-based scanning device, and an illumination module;
a third housing configured to at least partially receive said mobile communication terminal and said scanning module;
wherein said removable scanning module is configured to be communicatively coupled to said mobile communication terminal via an electromechanical interface;
wherein said electromechanical interface comprises a first plurality of wires electrically coupling a second electromechanical connector to a third electromechanical connector;
wherein said second electromechanical connector is configured to be electromechanically coupled to said first electromechanical connector; and
wherein said electromechanical interface comprises a second plurality of wires electrically coupling said scanning module to said first plurality of wires.

A2. The decodable indicia reading system of (A1), wherein said removable scanning module is configured to perform at least one of: outputting raw message data containing an encoded message and outputting decoded message data corresponding to an encoded message.

A3. The decodable indicia reading system of (A1), wherein said mobile communication terminal further comprises a wireless communication interface communicatively coupled to said microprocessor, said wireless communication interface at least partially disposed within said first housing.

A4. The decodable indicia reading system of (A1), wherein said mobile communication terminal further comprises an encoded information reading (EIR) device selected from the group consisting of: a bar code reading device, an RFID reading device, and a card reading device;
wherein said EIR device is configured to perform at least one of: outputting raw message data containing an encoded message and outputting decoded message data corresponding to an encoded message.

A5. The decodable indicia reading system of (A1), wherein said mobile communication terminal further comprises a built-in imaging device.

A6. The decodable indicia reading system of (A1), wherein said electromechanical interface is at least partially disposed within said second housing.

A7. The decodable indicia reading system of (A1), wherein said first electromechanical connector is provided by one of: a USB connector, a PCMCIA connector, an Ethernet connector.

A8. The decodable indicia reading system of (A1), wherein said mobile communication terminal is provided by one of: a mobile phone, a smart phone, a tablet personal computer (PC), a personal digital assistant (PDA).

A9. The decodable indicia reading system of (A1), wherein said imaging device comprises a two-dimensional image sensor configured to output an analog signal representative of light reflected by a physical object located within a field of view of said two-dimensional image sensor.

A10. The decodable indicia reading system of (A1), wherein said imaging device comprises:

a two-dimensional image sensor configured to output an analog signal representative of light reflected by a physical object located within a field of view of said two-dimensional image sensor;
an amplifier configured to produce an amplified analog signal by amplifying said analog signal; and
an analog-to-digital (A/D) converter configured to convert said amplified analog signal into a digital signal representative of said light reflected by said physical object.

A11. The decodable indicia reading system of claim A7, wherein said imaging device further comprises a control circuit configured to control said imaging device.

A12. The decodable indicia reading system of (A1), wherein said laser-based scanning device comprises a laser source, a photo-detector configured to generate an analog signal representative of a received light beam of variable intensity, and an analog-to-digital (A/D) converter configured to convert said analog signal into a digital signal.

A13. The decodable indicia reading system of (A1), wherein said illumination module comprises at least one of: an illumination pattern light source bank including one or more light sources, an aiming pattern light source bank including one or more light sources, and an illumination assembly control module.

B1. A removable scanning module for coupling to a mobile communication terminal via an electromechanical interface, said removable scanning module comprising a housing at least partially containing at least one of: an imaging device, a laser-based scanning device, and an illumination module;
wherein said electromechanical interface comprises a first plurality of wires electrically coupling a first electromechanical connector to a second electromechanical connector;
wherein said first electromechanical connector is configured to be electromechanically coupled to said mobile communication terminal;
wherein said second electromechanical connector is configured to be electromechanically coupled to a peripheral device; and
wherein said electromechanical interface comprises a second plurality of wires electrically coupling said scanning module to said first plurality of wires.

B2. The removable scanning module of (B1), wherein said removable scanning module is configured to be at least partially disposed within a housing configured to at least partially receive said mobile communication terminal and said removable scanning module.

B3. The removable scanning module of (B1), wherein said removable scanning module is configured to perform at least one of: outputting raw message data containing an encoded message and outputting decoded message data corresponding to an encoded message.

B4. The removable scanning module of (B1), wherein said first electromechanical connector is provided by one of: a USB connector, a PCMCIA connector, an Ethernet connector.

The invention claimed is:

1. A decodable indicia reading system comprising:
a mobile communication terminal comprising a first housing, a microprocessor disposed within said first housing, a memory disposed within said first housing, and at least one wired communication interface including a first electromechanical connector mechanically attached to said first housing;
a removable scanning module comprising a second housing at least partially containing at least one of: an encoded information reading (EIR) device and an illumination module;
a third housing configured to at least partially receive said mobile communication terminal and said scanning module;
wherein said removable scanning module is configured to be communicatively coupled to said mobile communication terminal via an electromechanical interface;
wherein said electromechanical interface comprises a first plurality of wires electrically coupling a second electromechanical connector to a third electromechanical connector;
wherein said electromechanical interface is at least partially disposed within said second housing of said removable scanning module;
wherein said second electromechanical connector is configured to be electromechanically coupled to said first electromechanical connector; and
wherein said electromechanical interface comprises a second plurality of wires electrically coupling said scanning module to said first plurality of wires.

2. The decodable indicia reading system of claim 1, wherein said EIR device is selected from the group consisting of: an optical indicia reading device, an RFID reading device, and a magnetic card reading device;
wherein said EIR device is configured to perform at least one of: outputting raw message data containing an encoded message and outputting decoded message data corresponding to an encoded message.

3. The decodable indicia reading system of claim 1, wherein said mobile communication terminal further comprises a wireless communication interface communicatively coupled to said microprocessor, said wireless communication interface at least partially disposed within said first housing.

4. The decodable indicia reading system of claim 1, wherein said mobile communication terminal further comprises a built-in encoded information reading (EIR) device selected from the group consisting of: a bar code reading device, an RFID reading device, and a card reading device;
wherein said EIR device is configured to perform at least one of: outputting raw message data containing an encoded message and outputting decoded message data corresponding to an encoded message.

5. The decodable indicia reading system of claim 1, wherein said mobile communication terminal further comprises a built-in imaging device.

6. The decodable indicia reading system of claim 1, wherein said first electromechanical connector is provided by one of: a USB connector, a PCMCIA connector, an Ethernet connector.

7. The decodable indicia reading system of claim 1, wherein said mobile communication terminal is provided by one of: a mobile phone, a smart phone, a tablet personal computer (PC), a personal digital assistant (PDA).

8. The decodable indicia reading system of claim 1, wherein said EIR device is provided by an imaging device comprising a two-dimensional image sensor configured to output an analog signal representative of light reflected by a physical object located within a field of view of said two-dimensional image sensor.

9. The decodable indicia reading system of claim 1, wherein said EIR device is provided by an imaging device comprising:
a two-dimensional image sensor configured to output an analog signal representative of light reflected by a physical object located within a field of view of said two-dimensional image sensor;
an amplifier configured to produce an amplified analog signal by amplifying said analog signal;

an analog-to-digital (A/D) converter configured to convert said amplified analog signal into a digital signal representative of said light reflected by said physical object; and a control circuit configured to control said imaging device.

10. The decodable indicia reading system of claim 1, wherein said EIR device is provided by a laser scanning device comprising a laser source, a photo-detector configured to generate an analog signal representative of a received light beam of variable intensity, and an analog-to-digital (A/D) converter configured to convert said analog signal into a digital signal.

11. The decodable indicia reading system of claim 1, wherein said illumination module comprises at least one of: an illumination pattern light source bank including one or more light sources, an aiming pattern light source bank including one or more light sources, and an illumination assembly control module.

12. A removable scanning module for coupling to a mobile communication terminal via an electromechanical interface, said removable scanning module comprising a housing at least partially containing at least one of: an encoded information reading (EIR) device and an illumination module;

wherein said electromechanical interface comprises a first plurality of wires electrically coupling a first electromechanical connector to a second electromechanical connector;

wherein said first electromechanical connector is configured to be electromechanically coupled to said mobile communication terminal;

wherein said electromechanical interface is at least partially disposed within said housing of the removable scanning module;

wherein said second electromechanical connector is configured to be electromechanically coupled to a peripheral device; and wherein said electromechanical interface comprises a second plurality of wires electrically coupling said scanning module to said first plurality of wires.

13. The removable scanning module of claim 12, wherein said ER device is selected from the group consisting of: an optical indicia reading device, an RFID reading device, and a magnetic card reading device;

wherein said EIR device is configured to perform at least one of: outputting raw message data containing an encoded message and outputting decoded message data corresponding to an encoded message.

14. The removable scanning module of claim 12, wherein said removable scanning module is configured to be at least partially disposed within a housing configured to at least partially receive said mobile communication terminal and said removable scanning module.

15. The removable scanning module of claim 12, wherein said first electromechanical connector is provided by one of: a USB connector, a PCMCIA connector, an Ethernet connector.

16. The removable scanning module of claim 12, wherein said ER device is provided by an imaging device comprising a two-dimensional image sensor configured to output an analog signal representative of light reflected by a physical object located within a field of view of said two-dimensional image sensor.

17. The removable scanning module of claim 12, wherein said DR device is provided by an imaging device comprising:

a two-dimensional image sensor configured to output an analog signal representative of light reflected by a physical object located within a field of view of said two-dimensional image sensor;

an amplifier configured to produce an amplified analog signal by amplifying said analog signal;

an analog-to-digital (A/D) converter configured to convert said amplified analog signal into a digital signal representative of said light reflected by said physical object; and a control circuit configured to control said imaging device.

18. The removable scanning module of claim 12, wherein said DR device is provided by a laser scanning device comprising a laser source, a photo-detector configured to generate an analog signal representative of a received light beam of variable intensity, and an analog-to-digital (A/D) converter configured to convert said analog signal into a digital signal.

19. The removable scanning module of claim 12, wherein said illumination module comprises at least one of: an illumination pattern light source bank including one or more light sources, an aiming pattern light source bank including one or more light sources, and an illumination assembly control module.

* * * * *